United States Patent
Scagliarini et al.

(10) Patent No.: US 9,428,304 B2
(45) Date of Patent: Aug. 30, 2016

(54) OVERPRESSURE SECURITY VENT AND EXHAUST DEVICE FOR A CONTAINER

(75) Inventors: Marco Scagliarini, Bologna (IT); Roberta Frulla, Zola Predosa (IT)

(73) Assignee: GVS S.P.A., Zola Predosa (Bologna) (IT)

( * ) Notice: Subject to any disclaimer, the term of this patent is extended or adjusted under 35 U.S.C. 154(b) by 49 days.

(21) Appl. No.: 13/704,139

(22) PCT Filed: Jun. 14, 2011

(86) PCT No.: PCT/IB2011/001361
§ 371 (c)(1),
(2), (4) Date: Dec. 13, 2012

(87) PCT Pub. No.: WO2011/161512
PCT Pub. Date: Nov. 29, 2011

(65) Prior Publication Data
US 2013/0098912 A1    Apr. 25, 2013

(30) Foreign Application Priority Data
Jun. 24, 2010   (IT) .............................. MI2010A1142

(51) Int. Cl.
  B65D 25/20    (2006.01)
  H01M 2/12     (2006.01)
(52) U.S. Cl.
  CPC ............ *B65D 25/20* (2013.01); *H01M 2/1205* (2013.01); *H01M 2/1229* (2013.01)
(58) Field of Classification Search
  None
  See application file for complete search history.

(56) References Cited

U.S. PATENT DOCUMENTS

| | | | |
|---|---|---|---|
| 3,436,273 A | 4/1969 | Gratzmuller | |
| 4,078,121 A | 3/1978 | Gratzmuller | |
| 5,538,807 A | 7/1996 | Hagiuda | |
| 5,554,455 A * | 9/1996 | Inoue et al. | 429/53 |
| 5,665,483 A * | 9/1997 | Saito et al. | 429/53 |
| 6,051,332 A | 4/2000 | Verhoog et al. | |

(Continued)

FOREIGN PATENT DOCUMENTS

| | | |
|---|---|---|
| CN | 1168542 A | 12/1997 |
| CN | 101517290 A | 8/2009 |

(Continued)

OTHER PUBLICATIONS http://www.allsealsinc.com/materials.html, Nov. 2014.*

(Continued)

*Primary Examiner* — Patrick Ryan
*Assistant Examiner* — Christopher Domone
(74) *Attorney, Agent, or Firm* — Vorys, Sater, Seymour and Pease LLP

(57) ABSTRACT

A vent and exhaust device for a container within which an overpressure of gas can be created during use, such as a battery for a vehicle. The device having a hollow body, suited to being arranged on an opening of such container with internal cavity, closed but communicating with the outside and with a passage connected to the inside of the container from which the gas that forms in the latter can pass to escape to the outside of the aforesaid body. There being placed on such passage a filter element permeable to such gas. Such filter element is subject to pressure placed in such cavity and suited to pushing it in the position of interception of the passage, but allowing the momentary opening of the latter for a venting of the gas when the pressure exceeds a predetermined value.

20 Claims, 3 Drawing Sheets

(56) References Cited

U.S. PATENT DOCUMENTS 6,376,119 B1 * 4/2002 Nann .................. H01M 2/1205
                                                                            429/54
8,292,109 B2 * 10/2012 Lauk et al. .................. 220/89.1

FOREIGN PATENT DOCUMENTS

| EP | 0875949 A1 | 11/1998 |
| FR | 2315773 A1 | 1/1997 |
| JP | H08-031398 A | 2/1996 |
| JP | H10-55793 A | 2/1998 |
| JP | H11-031492 A | 2/1999 |

OTHER PUBLICATIONS http://www.merriam-webster.com/dictionary/permeable, Nov. 2014.*
International Search Report dated Nov. 7, 2011 from priority International Application PCT/IS2011/001361.
Chinese Office Action dated Sep. 30, 2014 and comments, in corresponding Chinese patent application No. 201180028678.5.
Chinese Office Action dated May 21, 2015 and comments, in corresponding Chinese patent application No. 201180028678.5.
Japanese Office Action dated Feb. 16, 2014 in corresponding Japanese patent application No. 2013-515982.

* cited by examiner

OVERPRESSURE SECURITY VENT AND EXHAUST DEVICE FOR A CONTAINER

CROSS-REFERENCE TO RELATED APPLICATIONS

This application is a §371 National Stage Application of International Application No. PCT/IB2011/001361, filed on 14 Jun. 2011, claiming the benefit of Italian Patent Application No. MI2010A 001142 filed on 24 Jun. 2010.

The subject-matter of this invention is a vent and exhaust device for a container according to the preamble of the main claim. A device of this type is known from EP 0,875,949, FR 2,315,773 and U.S. Pat. No. 3,436,273.

Containers are known in which are put moving parts, electrical parts in which an environment is present containing chemical substances for electric power production (like batteries for a vehicle, land, water or flight-worthy) in which, during use of the container itself, a gas under pressure is formed. In particular, such containers must be continuously and slowly ventilated, but they must also be vented quickly (in order to prevent an explosion) in case the internal pressure exceeds a predetermined safety limit value.

With particular, but not restrictive reference to vehicle batteries and in particular to batteries containing lithium, it is known that these containers comprise one or more openings on which are alternatively placed devices (for closing of the openings) for exhausting of their internal environment or devices for rapid venting of gas (for example, hydrogen) that forms inside them. There are also known devices that have two independent parts coupled between themselves, a first part operating in exhaust and the other for rapid venting.

In the case of solely ventilating devices, rapid discharge of pressure to the outside of the container or battery cannot be obtained, with obvious disadvantages. At the same time, devices operating only for rapid venting allow quickly discharging pressure from the battery, but only when this, for any known reason (for example, when it is subject to extremely high temperatures or when the battery is short-circuiting) should reach a limit value. Such devices do not allow exhausting of the battery or rather the slow discharge to the outside of the latter of the gas that forms in it during use, which maintains the internal pressure of the container at acceptable values.

Exhaust devices comprise a body cavity capable of being placed on a corresponding opening of the battery; the internal cavity of the body is open to an extremity inserted in this opening so as to communicate with the inside of the battery, while the other extremity is in communication with the external environment through an opening closed by a filtrating element or membrane suited to allow a slow passage of gas from the inside of the battery to the outside. This membrane, hydrophilic or hydrophobic, does not allow the entrance of water in the container. It can be, for example, a polymer material or in nonwoven material.

Vent devices, instead, comprise a body for closing a correspondent opening of the container or battery, said body having a part that breaks in the event of internal overpressure of the container, thus allowing gas to discharge to the outside of the latter. These types of devices, necessary for a correct use of the battery (or similar), once having intervened, leave the opening of the latter completely free and the internal gas continues to escape freely, even also after the pressure in the battery has returned to an acceptable and safe value. This because the split part of the device does not independently close again. This situation, however, can be extremely dangerous in as much as the gas continuously escaping from the battery (for example, hydrogen), even in a significant way, can catch fire on contact with the air, with consequent risk of fire around and within the battery and therefore risk of its explosion (and of that of the adjacent batteries and/or the vehicle on which it is mounted).

The aim of the present invention is to offer a device suited to act both as an exhaust device as well as vent device for a container in which there can be gas overpressure during use.

In particular, the aim of the invention is to offer a monobody device that possesses both characteristics (exhaust and vent) of the known devices, this making it possible to render such device an overpressure security device.

Another aim is to offer a device of the mentioned type that allows the venting of gas and therefore of the internal pressure of the container only for the time necessary for such pressure to return to an acceptable value inside the aforesaid container.

A further aim is to offer a device of the mentioned type that has contained costs and that is of simple use.

These and other aims that will prove evident to the expert in the field are attained by an exhaust and vent device according to the attached claims.

For a better understanding of the present invention, the following drawings are attached purely by way of example, and not restrictive, in which.

Figure 1:
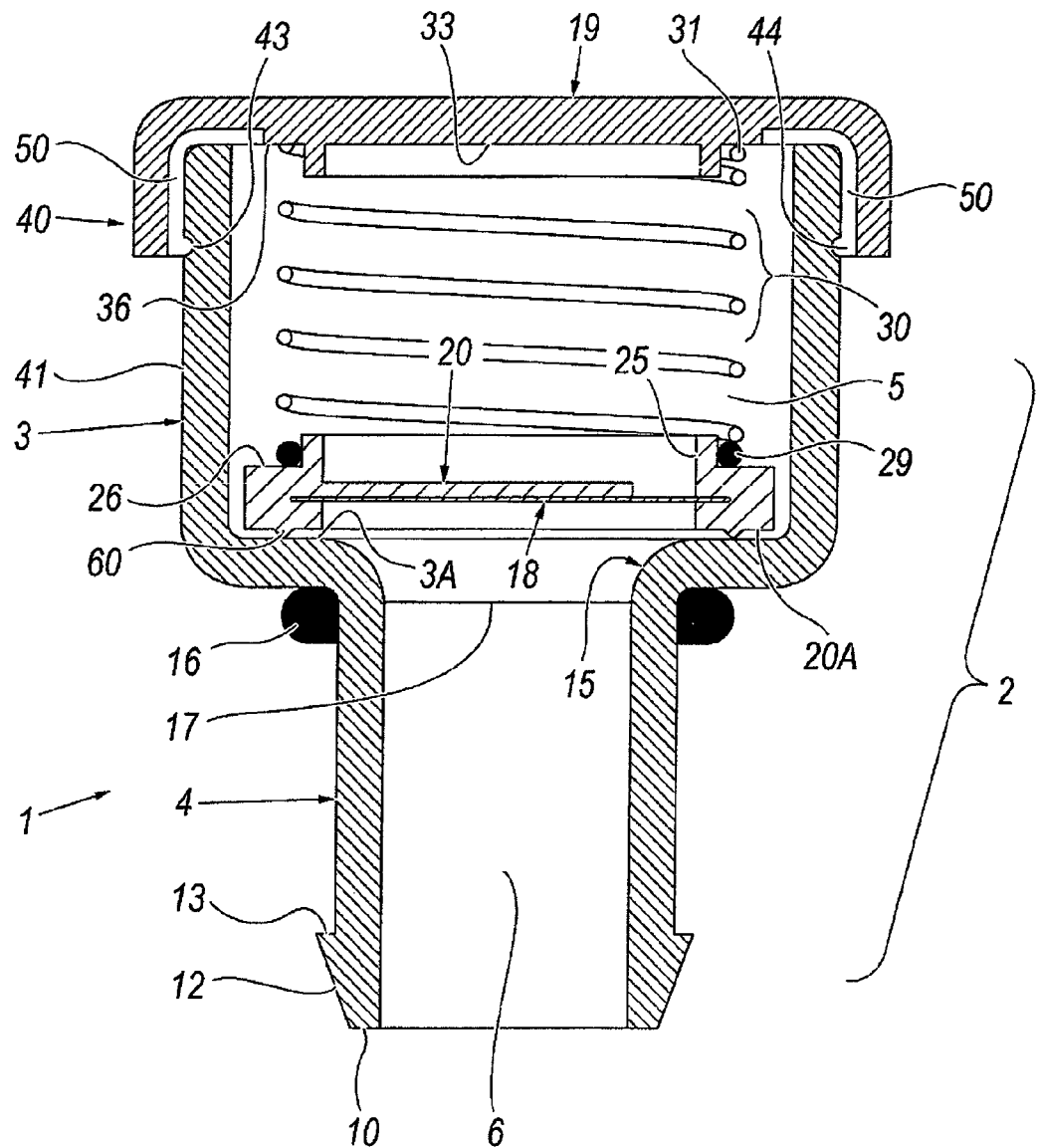
FIG. 1 shows a longitudinal cross-section of a device according to the invention.
Figure 2:
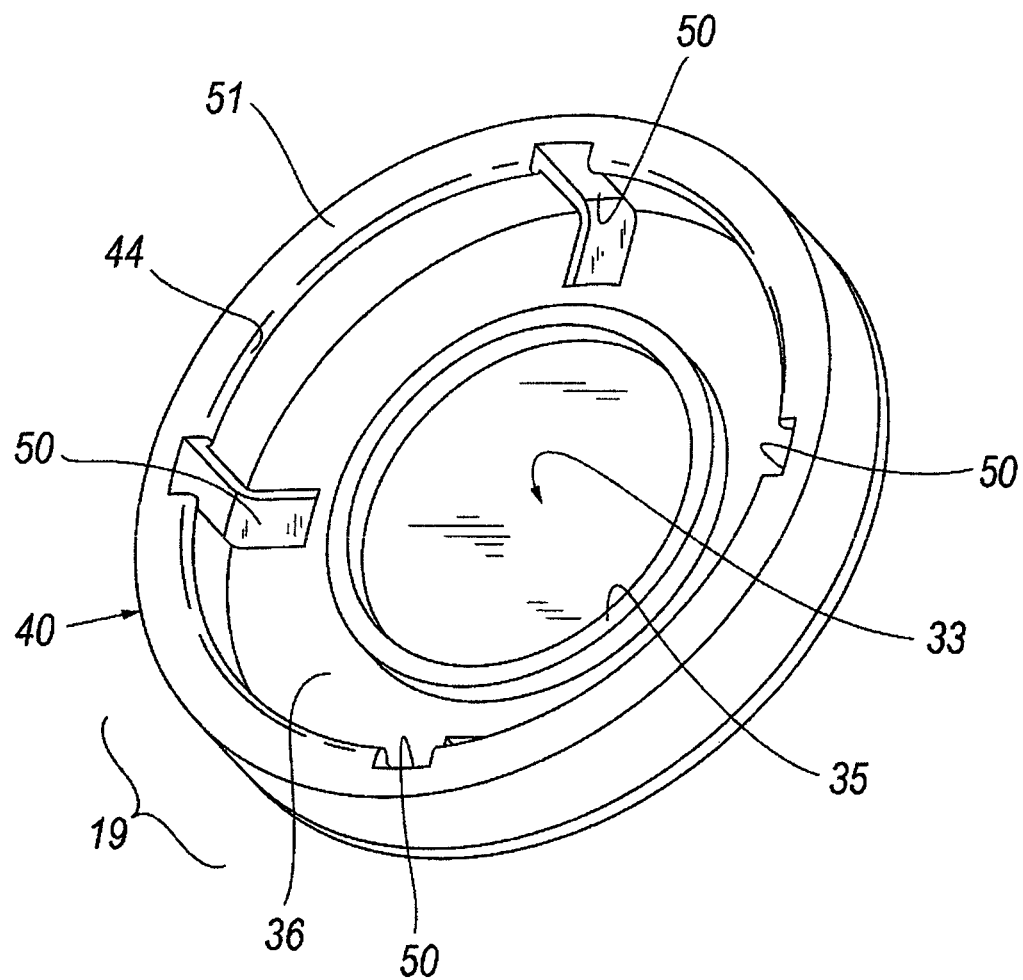
FIG. 2 shows a perspective view from below of a part of the device of FIG. 1.

With reference to the mentioned figures, a device according to the invention is generically indicated with 1 and comprises a body 2 having a first portion 3 and a second portion 4 connected between themselves, the first portion 3 having a greater transverse dimension compared to the second portion 4.

The body 2 is internally hollow in 5, said cavity being obtained in the first portion 3. This cavity is connected with a passage 6 realized in a second portion 4, this passage opening to a free extremity 10 of the second portion 4 suited to being coupled with an opening of a container, for example, a battery containing lithium (not shown) that must be ventilated and possibly vented from the container.

The extremity 10, in the example, comprises a tapered lateral external portion 12 suited to accommodate the introduction of it into the opening of the container or battery. This tapered portion 12 shows an undercut 13 suited to allow blocking, in any known way, the second portion 4 of the body 2 in the opening of the battery, and to maintain the coupling of the device 1 with this opening, even in the presence of overpressures in the battery generated by the gas present in it and formed with use of the battery itself (for known reasons and therefore not further described).

In order to maintain a tight coupling between the body 2 and the battery, in the proximity of a zone 15 of this body where the first portion 3 joins to the second portion 4, a seal element is placed around the latter, for example, an O-ring 16.

The passage 6 communicates with the cavity 5 of the body 2. Near the extremity 17 of this passage connected to the cavity 2 is placed a filter element 18 suited to allow the flow of gas from the inside of the container or battery towards the cavity 5; the latter is closed by a top 19 having, however, openings or exhaust routes for the gas towards the outside of the device 1, as will be described before.

The filter element 18 can be a membrane or realized in sinterized material. It can be in polymer material (like polyester or polypropylene), metallic salts or other, hydrophobic or hydrophilic, or in nonwoven material. Obviously other materials can be used, provided that they allow the gas that is formed in the container and having a pressure within the limits of 80-100 bars to exhaust from the battery without creating the arising of higher pressures (for example, equal to 100 bars) that could be dangerous for the battery itself.

Figure 3:
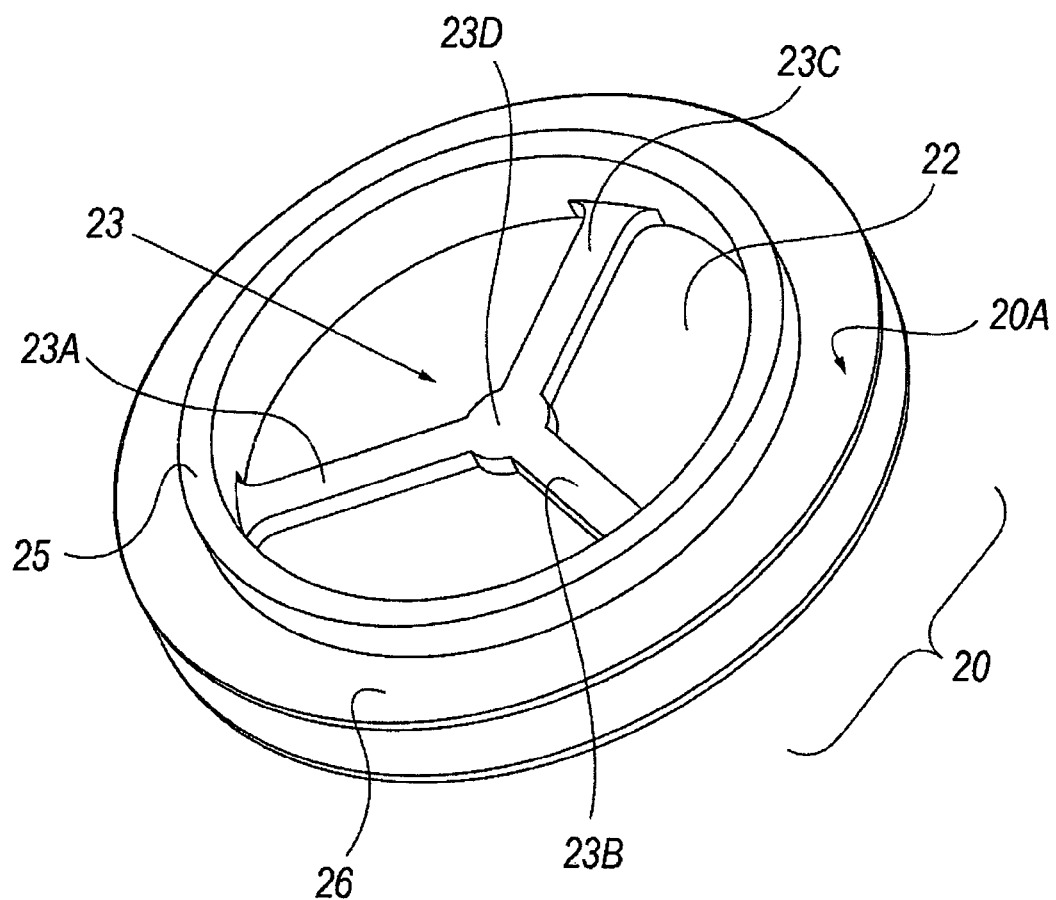
FIG. 3 shows a perspective view from above of another part of the device of FIG. 1.

The filter element 18 is joined (integral) to a ring-shaped support unit 20 (FIG. 3) that has a shape such as to support this element and at the same time protect it. More particularly, the support unit 20 has, as said, a ring-shaped form and supports the element 18 that is fixed to this unit through comolding, ultrasonic welding, thermowelding or other. The element is placed near the hole 22 of the unit 20.

In order to be protected against rupture provoked by an elevated pressure of the gas that moves in body 2 from the battery, this unit 20 has, within the hole 22, an arm or radial structure 23 whose arms 23A, 23B and 23C are connected at one extremity to a body 23D placed in the geometric center of the hole 22 and at the other extremity to the unit 20. Near such arms 23A, B, C is placed the filter element 18, turned towards the passage 6, in such a way that the pressure of the gas coming from the latter pushes this element towards the aforesaid arms that support it and avoid an excessive deformation that could split the element itself.

The ring-shaped unit 20 has, on one of its faces 20A turned towards the cavity 5, a raised edge 25 that delimits a flat zone 26 of this face 20A on which rests a first extremity 29 of a spring (or equivalent pressure element) 30 placed within the cavity 5 of the body 2 and resting, with its other (second) extremity 31 against the top 19 that closes this cavity 5. The top 19 has a first face 33 turned towards the inside of the body 2 and on which is present a ring-shaped protrusion 35 delimiting a ring-shaped zone 36 of this face on which rests the second extremity 31 of the spring 30.

The top 19 has the shape of a small glass for which the face 33 is grooved for a raised or protruding edge 40 turned towards first portion 3 of the body 2 of the device 1 and partially superimposed on a lateral external face 41 of this first portion 3 (that has a basically cylindrical form and therefore this face 41 represents the lateral surface of this cylinder). In the latter is present at least a ring-shaped notch 43 in which an extremity 44 of this edge 40 is coupled, so as to bind the stopper 69 to the first portion 3 of the above-mentioned body 2. This bond (removable) can be obtained by click coupling or screw coupling or bayonet coupling (providing for this purpose an appropriate structure on the above-mentioned surface or face 41) and allows tightly coupling this stopper to the body 2, so as to avoid separation in the event of a push of the gas present in the cavity 5 of the body 2.

In order to allow the escape of gas from this cavity, the top 19 and/or the portion 3 of the body 2 are supplied with adequate openings. In the example, notches 50 are realized partially in the face 33 and in the edge 40 (up to the free extremity 51 of this latter), said notches placing the cavity 5 of the body 2 in communication with the external environment.

It is now supposed that the device 1 is coupled to an opening of a battery. Such connection takes place, according to the example shown in the figures, by click mechanism; however, it can also be contemplated that the second portion 4 is realized in such a way (in itself known) as to be coupled to such opening by screwing or by bayonet.

During normal use of the battery, the gas that is created in it (for example, hydrogen) is "ventilated" by means of the filter element 18 (realized in a suitable way to let pass one or more types of gases or molecules), that allows such gas to pass from the passage 6 to the cavity 5 and therefore, through the notches (or equivalent openings) 50, into the external environment.

In the event that an overpressure is created within the battery, the gas acts on the element 18, which is pushed within the cavity 5 in opposition to the spring 30. It is to be noted that the elastic characteristic of the spring defines the pressure limit beyond which there is vent of the battery.

Due to, therefore, the elevated pressure, the element 18 and the unit 10 are pushed in the cavity 5 and the gas from passage 6 can reach, in relatively great quantity, the notches 50 and be discharged in the environment, preventing overpressure in the battery from making it explode. It is to be noted that the unit 20, on one of its faces 20A turned towards the body 2, has a protrusion 60 (for example, of triangular form) suited to cooperate with a flat extreme part, 3A in the portion 3 of this body next to the above-mentioned zone 15; this protrusion, when there is not any overpressure in the battery, acts as a seal element to prevent gas from bypassing the filter element 18 around the unit 20. Alternatively, on said face 20A can be placed a seal element, for example, ring-shaped, suited to cooperate with such part 3A and to create a seal with it when no overpressure is present in the container to which the body 2 is coupled.

With flow of gas to the outside of device 1, the pressure in the battery drops and the spring 30 brings the unit 20 and the element 18 back in such a position as to intercept the passage 6, blocking the free flow of gas to the outside of the device. The spring 30 keeps the passage 6 closed and there is no danger of continuous escaping of gas (which could catch fire on contact with the air, if in significant quantity), as in the known vent devices.

The invention, therefore, offers a one-piece device that carries out the function of exhaust (element 18 intercepting the passage 6) and vent (element 18 removed from the passage 6); all in a safe way, for which, one the "critical" phase of overpressure in the battery has terminated, the device again closes the passage 6 and reverts to operating in "exhaust" of the battery.

A specific form of the invention has been described; however, others yet are possible in light of the preceding description. For example, the top 19 can be fixed to the body 2 in a permanent way (for example, by welding), the filter element 18 can also operate without the presence of the unit 20, but be independently reinforced against overpressures; by way of example, the means of protection against rupture of the element 18 (like unit 20) could be a part of such element, such as a layer of resistant material like nylon inserted within it. In this case, the pressure element 30 (for example, the spring) can act directly on such vent element.

Such variants are also to be considered as comprised within the scope of the claims that follow.

The invention claimed is:

1. A vent and exhaust device for a container within which an overpressure of gas can be created during use, said device comprising:
    a hollow body suited to be arranged on an opening of such container,
    the hollow body comprising a first portion defining an internal cavity and a second portion defining a passage, the internal cavity of the hollow body being closed, but communicating with the outside of the hollow body and the passage for connecting to the inside of the container, from the passage the gas that forms in the container is passable through the internal cavity to vent to the outside of the hollow body,
a ring-shaped support unit having a central hole,
a filter element integral with the ring-shaped support unit, the filter element placed within the central hole such that gas passing through a central opening to the internal cavity must pass through the filter element,
on the passage being placed the filter element permeable to such gas at a pressure of from 80 to less than 100 bars,
the ring-shaped support unit being subject to a biasing force exerted by a pressure element placed in the internal cavity of the body, the pressure element acting directly on the ring-shaped support unit, the force being suited and biased to push the support-unit and the filter element in a first position of interception or closure of the passage,
wherein the ring-shaped support unit is moveable from the first position of interception or closure of the passage to a second position raised away from the passage to open the passage to flow the gas around the ring-shaped support unit and into the internal cavity,
the pressure element allowing the opening of said passage for a venting of the gas when the pressure exceeds a predetermined value of 100 bar, but bringing such filter element back in the first position of interception when the pressure of the gas in the container returns below said predetermined value.

2. The vent and exhaust device according to claim 1, wherein the pressure element comprises a spring placed in the internal cavity of the body for directly exerting on the support unit a downward force for pushing the support unit and the filter element in the position of interception or closure of the passage.

3. The vent and exhaust device according to claim 1, comprising arms for protecting the filter element from overpressure coming from the inside of the container, such arms arranged radially within the central hole of the support unit.

4. The vent and exhaust device according to claim 1, wherein the filter element has internal stiffening units.

5. The vent and exhaust device according to claim 1, wherein the pressure element has extremities, and wherein the pressure element acts, with one of the extremities, opposite to another of the extremities acting on the filter element, on a closing element of the internal cavity of the body of the device.

6. The vent and exhaust device according to claim 5, wherein said closing element is alternatively fixed to the body or is bound to the body in a removable way through mechanical coupling, at least one of said closing element and said body of the device defining at least a passage connecting the internal cavity of the hollow body with the external environment, such passage for passing the gas coming from the container.

7. The vent and exhaust device according to claim 1, wherein said body comprises a first portion connected to a second portion,
the first portion having the cavity containing the pressure element and being closed at an extremity of the closing element,
the second portion having the passage for communicating with the inside of the container, this second portion having an extreme part suited to being coupled with the container near a corresponding opening of the container,
there being a place in the proximity of a zone of such body where the first and second portion are connected and the movable filter element, integral with the support unit, is inside said cavity and subject to said pressure element.

8. The vent and exhaust device according to claim 7, wherein said first portion of the body has a greater transverse dimension than a transverse dimension of the second portion, said first portion having a rest part on which rests the filter element or the support unit to create a seal on said rest part and to prevent, in absence of overpressure of gas inside the container, such gas from circulating around said filter element and passing through the device.

9. The vent and exhaust device according to claim 1, wherein the container is a container of moving parts, electrical parts, chemical parts, or a vehicle battery.

10. The vent and exhaust device according to claim 1, there being provided means of protection of the filter element from overpressure coming from the inside of the container.

11. The vent and exhaust device according to claim 1, wherein the filter element comprises internal stiffening units comprising a layer of plastic material.

12. The vent and exhaust device according to claim 1, wherein the filter element comprises internal stiffening units comprising a layer of nylon.

13. The vent and exhaust device according to claim 1, wherein the support unit is fixed to the filter element by one selected from the group consisting of comolding, ultrasonic welding, and thermowelding.

14. The vent and exhaust device according to claim 1, wherein the filter element comprises one selected from the group consisting of a membrane, a sinterized material, a polyester, a metallic salt, and a nonwoven material.

15. The vent and exhaust device according to claim 1, wherein the filter element is hydrophobic.

16. The vent and exhaust device according to claim 1, wherein the filter element is hydrophilic.

17. The vent and exhaust device according to claim 1, wherein the ring-shaped support unit comprises an annular face, surrounding the central hole, the annular face having a flat zone upon which an extremity of the pressure element rests, and a raised edge defining an open void above the filter element.

18. A vent and exhaust device for a container within which an overpressure of gas can be created during use, said device comprising:
a hollow body for being arranged on an opening of the container, the hollow body having an upper portion and a lower portion, the lower portion defining a passage for connecting to the inside of the container,
an internal cavity of the hollow body being closed, but the upper portion communicating with the outside of the hollow body and the passage for connecting to the inside of the container, the gas that forms in the container is passable from the passage into the upper portion to vent to the outside of the hollow body,
on the passage being placed a filter element permeable to such gas at a first pressure,
a support unit for holding the filter unit, the support unit having a ring shaped form defining a central opening wherein the filter is within the support unit and extends across the central opening to block the opening and provide a through passageway for passing through the filter the gas that forms in the container,
a spring placed in the internal cavity of the body for directly exerting on the support unit a downward force for pushing the support unit and the filter element in the position of interception or closure of the passage, the spring allowing the opening of the passage for a venting of the gas when the pressure exceeds a predetermined second pressure which is higher than said first pressure, but bringing such filter element back in the interception position when the pressure of the gas in the container returns below said predetermined value, wherein the filter element is integral with the support unit.

19. The vent and exhaust device according to claim 1, wherein the filter element comprises one selected from the group consisting of a membrane, a sinterized material, a polyester, a metallic salt, and a nonwoven material.

20. The vent and exhaust device according to claim 18, wherein the ring-shaped support unit comprises an annular face, surrounding the central hole, the annular face having a flat zone upon which an extremity of the pressure element rests, and a raised edge defining an open void above the filter element.

* * * * *